United States Patent [19]

Trepka et al.

[11] 3,725,376

[45] Apr. 3, 1973

[54] POLYMERIZATION PROCESS EMPLOYING A POLYMERIZATION INITIATOR FORMED ON ADMIXING A VINYLTIN COMPOUND AND A HALOARYLLITHIUM COMPOUND

[75] Inventors: William J. Trepka; Richard J. Sonnenfeld, both of Bartlesville, Okla.

[73] Assignee: Phillips Petroleum Company, Bartlesville, Okla.

[22] Filed: Apr. 8, 1971

[21] Appl. No.: 132,619

Related U.S. Application Data

[62] Division of Ser. No. 811,579, March 28, 1969, Pat. No. 3,620,963.

[52] U.S. Cl............260/94.3, 252/431 R, 260/82.1, 260/82.5, 260/83.5, 260/84.1, 260/85.5 M, 260/88.3 R, 260/88.5, 260/88.7 R, 260/88.7 C, 260/88.7 E, 260/89.5 A, 260/89.7 R, 260/93.5 S, 260/94.2 M

[51] Int. Cl............C08d 1/20, C08f 5/00, C08f 7/00

[58] Field of Search.....260/94.3, 82.1, 93.5, 94.2 M, 260/82.5, 84.1, 85.5 R, 86.7, 88.3 R, 88.5, 88.7 R, 89.5 A, 89.7 R

[56] References Cited

UNITED STATES PATENTS 3,536,691 10/1970 Trepka et al........................260/94.2

Primary Examiner—James A. Seidleck
Assistant Examiner—William F. Hamrock
Attorney—Young & Quigg

[57] ABSTRACT

A polymerization process for the polymerization of conjugated dienes to gel-free polymers of high cis content and relatively low inherent viscosity, and for polymerization of other polymerizable monomers, which employs a polymerization initiator formed on admixing a vinyltin compound and a haloaryllithium compound selected from 3-halophenyllithium, 1-halo-3-naphthyllithium, 3-halo-1-naphthyllithium, milled 4-halophenyllithium, and milled 4-halonaphtyllithium.

10 Claims, No Drawings

POLYMERIZATION PROCESS EMPLOYING A POLYMERIZATION INITIATOR FORMED ON ADMIXING A VINYLTIN COMPOUND AND A HALOARYLLITHIUM COMPOUND

This application is a divisional application of Ser. No. 811,579 filed Mar. 28, 1969, now U.S. Pat. No. 3,630,963.

This invention relates to a polymerization initiator formed as the reaction product of haloaryllithium compounds and a vinyltin compound. In another aspect, this invention further relates to an improved process for polymerizing conjugated dienes.

It has now been discovered that the reaction product of haloaryllithium compounds and vinyltin compounds is an excellent polymerization initiator. Employment of our polymerization initiator to polymerize conjugated dienes surprisingly enables production of gel-free polymers possessing a high cis content and relatively low inherent viscosity.

It is an object of this invention to provide a novel polymerization initiator. It is another object of this invention to provide a process for the polymerization of conjugated dienes. It is yet another object of this invention to provide an improved process for producing polymers of conjugated dienes having a high percentage of cis-1,4-addition, having relatively low inherent viscosity, and being gel-free. It is yet another object of this invention to provide a process for producing rubbery polymeric products having improved properties.

These and other objects and advantages of the invention will become apparent to those skilled in the art upon consideration of the accompanying disclosure and the appended claims.

According to this invention the haloaryllithium compounds that can be employed are 3-halophenyllithium compounds, 1-halo-3-naphthyllithium compounds, and 3-halo-1-naphthyllithium compounds. 4-Halophenyllithium compounds and 4-halonaphthyllithium compounds which have been ball-milled or otherwise subjected to attrition devices can also be employed according to this invention. The halogens of said haloaryllithium compounds are selected from fluorine, bromine, or chlorine. Mixtures of said haloaryllithium compounds can also be employed.

As hereinbefore stated the 4-halonaphthyllithium compounds and 4-halophenyllithium compounds which have been ball-milled can be employed according to this invention. The ball-milling of these compounds increases their overall effectiveness. The various kinds of milling procedures, conditions, techniques, and advantages of said procedures are fully described in copending application, Ser. No. 772,865, William J. Trepka, filed Nov. 1, 1968.

The increase in activity of the 4-halonaphthyllithium compounds and the 4-halophenyllithium compounds is achieved by imparting an abrasive force upon the 4-halonaphthyllithium compounds and the 4-halophenyllithium compounds such as by applying an abrasive action through various attrition devices.

Various mills and the like, wherein stainless steel balls, the walls of the vessel, blades or vanes of a stirrer, the solid particles of the compound itself, or the like, can provide the abrasive force against the 4-halonaphthyllithium compound or the 4-halophenyllithium compound. A ball or pebble mill are exemplary devices.

A preferred device is an ultrasonic bath such as a Model G-140 made by the National Ultrasonic Corporation which imparts a work force of ultrasonic energy upon the halophenyllithiums and the halonaphthyllithiums.

It is to be understood that within the perimeters of this disclosure and claims that the term "milling" includes all the methods and devices as enumerated above as well as those known generally throughout the art.

The milling is performed under an inert atmosphere such as argon, helium, nitrogen, and the like, and can take place in the presence or absence of an inert diluent such as aliphatic, cycloaliphatic, or aromatic hydrocarbons.

In one embodiment, the milling process is carried out during the preparation of the 4-halophenyl or the 4-halonaphthyl initiator.

In the milling process, the time employed will depend upon the particular method or milling device chosen, but will at least be sufficient to cause the desired increase in initiator activity. For ball milling or ultrasonic milling, the time employed will range from about 1 minute to 100 hours, preferably about 1 to about 24 hours. The optimum time period depends, in general, on the efficiency of the equipment used and the particular 4-halophenyllithium compound or 4-halonaphthyllithium compound employed. The frequency and force of collision as in ball milling and the wave frequency, intensity, and absorbing capacity of the ultrasonic milled compound will vary the time employed.

The ultrasonic vibration frequency generally will be at least 20 to 1,000 kc/s (kilocycles per second).

The intensity, i.e., average rate of energy flow per unit area of the ultrasonic bath, varies from about $10^{-4}$ to 20 w/cm$^2$ (watts per square centimeter) and preferably from about 0.1 to 10 w/cm$^2$.

The time period most suitable for any given milling equipment can easily be determined by routine experimentation.

As used herein, the term "ultrasonic" means vibratory waves of a frequency above the limit of the human ear.

The temperature employed during the milling process can be varied over a wide range and is conducted below the melting point of the compound to be milled and is generally in the range of about $-50°$ to 200° C, preferably from about 0° to 100° C.

Exemplary haloaryllithium compounds that can be reacted with the vinyltin compounds are 3-bromophenyllithium; 3-bromo-1-naphthyllithium; 3-chlorophenyllithium; 3-chloro-1-naphthyllithium; 3-fluorophenyllithium; 3-fluoro-1-naphthyllithium; 1-chloro-3-naphthyllithium; 1-fluoro-3-naphthyllithium; 1-bromo-3-naphthyllithium; 4-bromophenyllithium; 4-bromo-1-naphthyllithium; 4-chlorophenyllithium; 4-chloro-1-naphthyllithium; 4-fluorophenyllithium; 4-fluoro-1-naphthyllithium; 4-bromo-1-naphthyllithium; and mixtures of the foregoing compounds; and the like.

Haloaryllithium compounds employed in this invention can be prepared by any method desired. U.S. Pat. No. 3,215,670, issued to Trepka, Nov. 2, 1965, discloses a suitable procedure.

The vinyltin compounds that can be employed according to this invention can be represented by the following general formula:

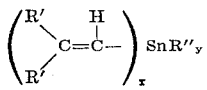

wherein $x$ is an integer from 1 to 4, wherein the sum of $y$ and $x$ equals 4; wherein R' is hydrogen or an alkyl or cycloalkyl hydrocarbon radical containing one to six carbon atoms; and wherein R" is an alkyl, cycloalkyl or aryl radical, or combinations thereof, such as aralkyl, containing from one to 12 carbon atoms. Hydrocarbyl tin compounds having two to four vinyl groups per molecule of said tin compound and up to 16 carbon atoms in said compound are particularly suitable.

Exemplary vinyltin compounds are methyltrivinyltin; 1-dodecyltrivinyltin; cyclohexyltrivinyltin; cyclododecyltrivinyltin; (2-hexyl-1-octenyl)trimethyltin; 1-octenyltriethyltin; vinyltridodecyltin; divinyldicyclohexyltin; ethylcyclohexyldivinyltin; di(1-propenyl)dibutyltin; 2-ethylcyclohexenyltrihexyltin; (2,2-dicyclopentylvinyl)trimethyltin; vinyltrimethyltin; divinyldimethyltin; tetravinyltin; vinyl(1-pentenyl)cyclohexylbutyltin; (1-octenyl)(2-methyl-1-hexyl)dimethyltin; diphenyldivinyltin; methylphenyldivinyltin; benzyltrivinyltin; and the like.

The haloaryllithium compound and vinyltin compound are contacted at least about 30 minutes prior to charging the reaction product as the polymerization initiator. The preferred contacting time is in the range of about 30 minutes to 10 hours. Longer contacting time can of course be employed.

The temperature employed need only be sufficient to allow said reaction product to form within a reasonable time. Temperatures for said reaction product formation are in the range of about 30° to 100°C, preferably 40° to 80°C.

The mole ratio of the haloaryllithium compound to the vinyltin compound will depend upon the particular compounds used but will generally be within the range of about 1:1 to 4:1.

The compounds can be contacted in the presence or absence of an inert hydrocarbon diluent. Aromatic hydrocarbons, paraffins, or cycloparaffins, containing from about four to 10 carbon atoms per molecule can be suitably employed. Exemplary diluents are benzene, toluene, cyclohexane, methylcyclohexane, xylene, n-butane, n-hexane, n-pentane, n-heptane, isooctane, mixtures thereof, and the like.

The initiator produced according to this invention by the prereaction of the haloaryllithium compound and the vinyltin compound is not duplicated by mixing the two compounds and then charging them immediately to the polymerization system. Neither are the desired results of obtaining a high cis, gel-free polymer of low inherent viscosity achieved by charging the vinyltin compound to a polymerization mixture containing a haloaryllithium compound.

The reaction product of the haloaryllithium compound and the vinyltin compound provides an exceptional stereospecific polymerization initiator. Although unusual with organolithium initiators in general, the initiator of this invention enables conjugated dienes to be polymerized to gel-free polymers having a combination of high cis-content and relatively low inherent viscosity.

Conjugated diene monomers containing about four to 12 carbon atoms per molecule and preferably about four to eight carbons can be polymerized according to this invention. Exemplary monomers are 1,3butadiene; isoprene; piperylene; 2,3-dimethyl-1,3-butadiene; 2-methyl-3-ethyl-1,3-butadiene; 3methyl-1,3-pentadiene; 2-methyl-3-ethyl-1,3-pentadiene; 2-ethyl-1,3-pentadiene; 1,3-hexadiene; 2-methyl-1,3-hexadiene; 1,3-heptadiene; 3methyl-1,3-heptadiene; 1,3-octadiene; 3-butyl-1,3octadiene; 3,4-dimethyl-1,3-hexadiene; 3-n-propyl-1,3-pentadiene; 4,5-diethyl-1,3-octadiene; 2-phenyl-1,3-butadiene; 2,3-diethyl-1,3-butadiene; 2,3-di-n-propyl-1,3-butadiene; 2-methyl-3-isopropyl-1,3-butadiene, and the like.

The initiators of this invention can, however, be generally employed for the polymerization of the same monomers that can be polymerized with any organolithium initiator. Polymerizable monomers such as the vinyl-substituted aromatic compound, polar monomers, or mixtures thereof, can be homopolymerized or copolymerized with the conjugated dienes to form random or block copolymers.

Vinyl-substituted aromatic compounds employable include styrene, alpha-methyl styrene, 1-vinylnaphthalene, 1-alpha-methylvinylnaphthalene, 2-alpha-methylvinylnaphthalene, and alkyl, cycloalkyl, aryl, alkylaryl, and arylalkyl derivatives thereof in which the total carbon atoms in the combined hydrocarbon sibustituents is generally not greater than 12. Exemplary of some of these compounds are 3-methylstyrene; 3,5-diethylstyrene; 2-ethyl-4-benzylstyrene; 6-cyclohexyl-1-vinylnaphthalene; 2,4,6,8-tetramethyl-1-alpha-methyl-vinylnaphthalene; and the like.

Among the polar compounds applicable are vinylpyridines, vinylquinolines and vinylisoquinolines in which the vinyl groups are positioned on a ring carbon other than a beta carbon with respect to the nitrogen. These pyridine, quinoline, isoquinoline derivatives can carry substituents such as alkyl, cycloalkyl, aryl, and mixtures thereof such as alkylaryl, arylalkyl, alkylcycloalkyl and the like, as well as alkoxy, aryloxy, and dialkylamino groups. The total carbon atoms in the comprised substituents is generally not greater than 12. Exemplary of these heterocyclic-nitrogen monomers are 2-vinylpyridine; 4-vinylpyridine; 5-n-octyl-2-vinylpyridine; 4-phenyl-2-vinylpyridine; 4-phenoxy-2-vinylpyridine; 6-methoxy-2-vinylpyridine; 4-vinylquinoline; 3-methyl-4-vinylquinoline; 3-methyl-4-methoxy-2-vinylquinoline; 3-vinylisoquinoline; 4-tert-dodecyl-1-vinylisoquinoline; 3-dimethylamino-3-vinylisoquinoline; 4-benzyl-3-vinylisoquinoline; and the like.

Other polar monomers include acrylic and alkacrylic acid esters, nitriles, N,N-di-substituted amides, such as methyl acrylate, ethyl acrylate, butyl acrylate, methyl methacrylate, ethyl methacrylate, propyl methacrylate, butyl methacrylate, isopropyl ethacrylate, acrylonitrile, methacrylonitrile, N,N-dimethylacrylamide, and N,N-diethylmethacrylamide. Vinylfuran and N-vinylcarbazole can also be used.

The conjugated dienes can be polymerized according to conditions generally known in the art. Polymerization is preferably conducted in the presence of an inert hydrocarbon diluent such as those used in the initiator preparation. Polymerization can be conducted in bulk without employment of said inert diluent if desired.

The temperature employed for the polymerization is that which is normally and for organolithium polymerization of dienes, and is generally in the range of about 0° to 150°C, preferably from 30° to 125°C. It is preferred to employ sufficient pressure during the polymerization to maintain the reaction mixture substantially in liquid phase.

The amount of initiator employed in the polymerization process can be varied over a fairly broad range to change the molecular weight of the polymer formed. To make solid polymers the initiator level is usually in the range of about 0.1 to 10 gram millimoles of initiator per 100 grams of monomer (mhm); preferably about 0.3 to 5 mhm for rubber used in tire treads.

The rubbery polymers produced in accordance with this invention can be compounded by any of the known methods such as have been used in the past for compounding rubbers. Vulcanizing agents, vulcanization accelerators, accelerator activators, reinforcing agents, antioxidants, softeners, plasticizers, fillers, and other compounding ingredients such as have been normally employed in rubbers can likewise be used in the polymers of this invention. The rubbery diene polymers have utility in application where both natural and synthetic rubbers are used. In addition, the rubbery polymers produced by the method of this invention can be blended by any suitable method with other synthetic rubbers and/or natural rubber. For example, they can be used in the manufacture of automobile tires, gaskets, and other rubbery articles.

Illustrative of the foregoing discussion and not to be interpreted as a limitation on the scope thereof or on the materials therein employed the following examples are presented.

EXAMPLE I n-Butyllithium and 1,3-dibromobenzene in amounts to yield 3-bromophenyllithium were reacted together and this product was then reacted with tetravinyltin to produce a polymerization initiator. The following recipe was employed:

| | |
|---|---|
| 1,3-Dibromobenzene, mmoles | 20 |
| n-Butyllithium, mmoles | 22 |
| Tetravinyltin, mmoles | 10 |
| Toluene, ml | 100 |
| Temperature, °C | 50 |
| Times, hours (total) | 4 |

Toluene was charged to the reactor first and the reactor then purged with nitrogen. 1,3-Dibromobenzene was added followed by the n-butyllithium. The temperature was maintained at 50°C for 2 hours to allow time for the production of 3-bromophenyllithium. Tetravinyltin was then added and the reaction was continued for 2 more hours at 50°C. The alkaline molarity of the reaction mixture was determined by titration of a measured aliquot with 0.1 N HCl and found to be 0.15.

The 3-bromophenyllithium-tetravinyltin reaction product was then employed as an initiator for the polymerization of butadiene according to the following recipe:

| | |
|---|---|
| 1,3Butadiene, parts by weight | 100 |
| Cyclohexane, parts by weight | 780 |
| Initiator, mhm[a] | variable |
| Temperature, °C | 70 |
| Time, hours | 15 |

[a] gram millimoles per 100 grams monomer.

The cyclohexane was charged to the reactor first followed by a nitrogen purge. Butadiene was introduced and then the initiator. The reaction was shortstopped with approximately 1 part by weight per 100 parts by weight rubber of 2,2'-methylene-bis(4-methyl-6-tert-butylphenol) (employed as a 10 weight percent solution in isopropyl alcohol). The polymer was coagulated in isopropyl alcohol, separated, and dried in a vacuum oven. The results are presented in Table I.

TABLE I

| Run No. | Initiator (mhm.) | Conv., percent | Microstructure, percent [a] | | | Inherent viscosity [b] | Gel, percent [c] |
|---|---|---|---|---|---|---|---|
| | | | Cis | Trans | Vinyl | | |
| 1 | 1.2 | 98.4 | 71.5 | 22.2 | 6.3 | 3.14 | 0 |
| 2 | 2.0 | 91.0 | 60.8 | 33.2 | 6.0 | 2.30 | 0 |
| 3 | 3.0 | 96.4 | 61.1 | 31.5 | 6.4 | 1.79 | 0 |

[a] Determined according to U.S. Patent 3,215,679, col. 12, note (K).
[b] Determined according to U.S. Patent 3,215,679, col. 11, note (B).
[c] Determined according to U.S. Patent 3,215,679, col. 11, note (C).

A control run using n-butyllithium (2.0 mhm) as the initiator for the polymerization of butadiene according to the above formula produced a polymer with a cis-content of 37 percent. The above example demonstrates that gel-free polybutadiene with relatively low inherent viscosity can be produced with initiators of this invention. A much higher cis-containing polymer is produced than that obtained when employing the conventional organolithium initiators.

EXAMPLE II

A 3-bromophenyllithium-tetravinyltin reaction product as prepared in Example I was employed in varying amounts as the initiator for the polymerization of butadiene in a series of runs. Comparative series of runs were also made using 3-bromophenyllithium as the initiator and employing tetravinyltin as an adjuvant. The tetravinyltin adjuvant was added immediately following the initiator. The amount of adjuvant employed in these runs corresponded to the quantity of tetravinyltin in the 3-bromophenyllithium-tetravinyltin initiator employed in the other series of runs. The polymerization recipe and procedures employed in Example I were also used. The polymers were gel-free. The results are presented in Table II.

TABLE II

| Run | Initiator | | Adjuvant, mhm. | Conv., percent | Microstructure, percent [c] | | | Inherent viscosity [d] |
|---|---|---|---|---|---|---|---|---|
| | Type | Mhm. | | | Cis | Trans | Vinyl | |
| 1 | BPL-TVT [a] | 1.5 | 0 | 98.8 | 67.3 | 27.0 | 5.7 | 2.47 |
| 2 | BPL-TVT | 2.0 | 0 | 99.4 | 68.6 | 25.5 | 5.9 | 2.11 |
| 3 | BPL-TVT | 2.5 | 0 | 99.0 | 66.8 | 27.0 | 6.2 | 1.83 |
| 4 | BPL-TVT | 3.0 | 0 | 97.8 | 68.0 | 26.2 | 5.8 | 1.67 |
| 5 | BPL [b] | 1.5 | 0.75 | 97.8 | 52.7 | 39.9 | 7.4 | 2.28 |
| 6 | BPL | 2.0 | 1.00 | 98.5 | 49.9 | 42.0 | 8.1 | 1.89 |
| 7 | BPL | 2.5 | 1.25 | 95.6 | 51.1 | 41.3 | 7.6 | 1.78 |
| 8 | BPL | 3.0 | 1.50 | 97.3 | 48.6 | 43.4 | 8.0 | 1.60 |

[a] 3-bromophenyllithium/tetravinyltin reaction product.
[b] 3-bromophenyllithium.
[c] Determined according to U.S. Patent 3,215,679, col. 12, Note (K).
[d] Determined according to U.S. Patent 3,215,679, col. 11, Note (B).

The above example effectively demonstrates that the initiator prepared according to this invention, i.e., represented by Runs 1 through 4, provides a polymerization system unlike that produced when tetravinyltin is employed as an adjuvant rather than when the initiator is prepared by reacting the 3-bromophenyllithium with the tetravinyltin prior to charging it into polymerization system. The tetravinyltin when employed as an adjuvant served as a modifier as is evidenced by the inherent viscosity data and the lowered cis-content. The inherent viscosity values for the polymers produced according to this invention were only slightly higher than those of Runs 5 through 8; but the polymers had a much higher cis content.

EXAMPLE III

Polybutadiene was prepared in two polymerization runs using the 3-bromophenyllithium/tetravinyltin reaction product prepared as in Example I. The polymers produced were compounded in a tire tread stock recipe, cured, and the physical properties determined. Data are presented in Table III.

TABLE III

| Polymerization Recipes | 1 | 2 |
|---|---|---|
| 1,3-Butadiene, parts by weight | 100 | 100 |
| Cyclohexane, parts by weight | 780 | 780 |
| Initiator, mhm | 2.4 | 2.0 |
| Temperature, °C | 70 | 70 |
| Time, hours | 15 | 15 |
| Conversion, % | 96.5 | 88 |
| Polymer Properties | 1 | 2 |
| Microstructure, %[a] | | |
| cis | 77.1 | 73.8 |
| trans | 17.7 | 21.4 |
| Vinyl | 5.2 | 4.8 |
| Inherent viscosity[b] | 1.88 | 2.03 |
| Gel, %[c] | 0 | 0 |
| ML-4 at 212°F[d] | 31.5 | 39.2 |
| Compounding Recipe, Parts by Weight | | |
| Polymer | 100 | 100 |
| High Abrasion furnace black | 50 | 50 |
| Zinc oxide | 3 | 3 |
| Stearic acid | 2 | 2 |
| Flexamine[1] | 1 | 1 |
| Aromatic oil (Philrich 5)* | 10 | 10 |
| Sulfur | 1.75 | 1.75 |
| NOBS Special[2] | 1.0 | 1.0 |
| Cured 30 Minutes at 307°F | 1 | 2 |
| 300% Modulus, psi[e] | 910 | 820 |
| Tensile, psi | 2120 | 2100 |
| ΔT, °F | 64.5 | 62.2 |
| Resilience, % | 72.0 | 72.8 |
| Shore A hardness | 51.5 | 51.5 |

[1] Physical mixture containing 65 per cent of a complex diarylamine-ketone reaction product and 35 per cent of N,N'-diphenyl-p-phenylenediamine.
[2] 2-oxydiethylene-2-benzothiazole sulfenamide.
[a] Determined according to U.S. Pat. No. 3,215,679, Col. 12, Note (K).
[b] Determined according to U.S. Pat. No. 3,215,679, Col. 11, Note (B).
[c] Determined according to U.S. Pat. No. 3,215,679, Col. 11, Note (C).
[d] Determined according to ASTM D 1646-63
[e] Determined according to ASTM D 412-62T
[f] Determined according to ASTM D 623-62
[g] Determined according to ASTM D 945-59
[h] Determined according to ASTM D 1706-61
*Trademark The above example demonstrates that polybutadiene prepared with a polymerization initiator of this invention contains high cis microstructure and good vulcanizate properties.

EXAMPLE IV

A 3-bromophenyllithium/tetravinyltin reaction product was prepared as in Example I. The initiator was employed for the polymerization of isoprene. Two additional runs employing 3-bromophenyllithium as the initiator and tetravinyltin as an adjuvant were tested. The following polymerization recipe was employed:

| Isoprene, parts by weight | 100 |
|---|---|
| Cyclohexane, parts by weight | 1000 |
| Initiator, mhm | variable |
| Tetravinyltin, mhm | variable |

Polymerizations were conducted at 70°C. The procedure was the same as that employed in Example II. The adjuvant was added immediately following the initiator and the amount used corresponded to the quantity of tetravinyltin in the 3-bromophenyllithium-tetravinyltin initiator. The polymers produced were gel-free. Results of the polymerization are presented in Table IV.

TABLE IV

| Run No. | Initiator Type | Mhm. | TVT[c] adjuvant (mhm.) | Conv., percent | Microstructure[d] Cis | 3,4-addn. | Inherent viscosity[e] |
|---|---|---|---|---|---|---|---|
| 1 | BPL TVT[a] | 2.5 | 0 | 85 | 90 | 6.1 | 2.18 |
| 2 | BPL TVT | 3.0 | 0 | 79 | 89 | 6.2 | 1.91 |
| 3 | BPL[b] | 2.5 | 1.46 | 84 | 80 | 7.8 | 2.01 |
| 4 | BPL | 3.0 | 1.74 | 87 | 83 | 7.4 | 1.65 |

[a] 3-bromophenyllithium-tetravinyltin reaction product.
[b] 3-bromophenyllithium.
[c] Tetravinyltin.
[d] Determined according to U.S. Patent 3,215,679, col. 11, Note (A).
[e] Determined according to U.S. Patent 3,215,679, col. 31, Note (B).

Polyisoprene, when prepared according to this invention has a higher cis-content than when prepared, as in Runs 3 and 4, where tetravinyltin is an adjuvant modifier. While tetravinyltin was satisfactory in producing a polymer of relatively low inherent viscosity, the low inherent viscosity was obtained at a sacrifice in the cis-content. Runs 1 and 2 were conducted according to this invention and demonstrate that a combination of relatively low inherent viscosity and high cis-containing polymer can be produced.

EXAMPLE V

Four polymerization initiators were prepared according to the following recipes:

| | W | X | Y | Z |
|---|---|---|---|---|
| 1,3-Dibromobenzene, mmoles | 20 | 20 | 20 | 20 |
| n-Butyllithium, mmoles | 22 | 22 | 22 | 22 |
| Toluene, ml | 100 | 100 | 100 | 100 |
| Tetravinyltin, mmoles | 5 | 10 | 15 | 0 |
| Bromophenyllithium/VT mole ratio | 4/1 | 2/1 | 1.33/1 | |
| Temperature, °C | 50 | 50 | 50 | 50 |
| Time, hours (total) | 4 | 4 | 4 | 2 |
| Molarity | 0.15 | 0.145 | 0.16 | 0/16 |

Toluene was charged to the reactor first and the reactor was then purged with nitrogen. The 1,3-dibromobenzene was added followed by the butyllithium. The temperature was maintained at 50°C for 2 hours to allow time for the production of 3-bromophenyllithium. Tetravinyltin was added (Runs W to Y) and the reaction was continued for 2 more hours at 50°C. Run Z was the control initiator wherein no tin compound was employed. The molarity was determined by titration of a measured aliquot of the reaction mixture with 0.1 N HCl and using phenolphthalein as the indicator.

Each of the above initiators was then employed for the polymerization of isoprene. In each polymerization run 100 parts by weight of isoprene and 1,000 parts by weight of cyclohexane were used. The initiator level in each run was 1.2 mhm. Polymerizations were conducted at 70°C and the results thereof are presented in Table V.

TABLE V

| Run No. | Initiation from Run | Conv., % | Microstructure,%[a] cis | 3,4-Addn. | Inherent[b] Viscosity |
|---|---|---|---|---|---|
| 1 | W | 98 | 84 | 6.5 | 4.65 |
| 2 | X | 80 | 90 | 5.8 | 3.41 |
| 3 | Y | 65 | 89 | 6.2 | 2.32 |
| 4 | Z | 89 | 84 | 7.0 | 5.01 |

[a]Determined according to U.S. Pat. No. 3,215,679, col. 11, Note (A).
[b]Determined according to U.S. Pat. No. 3,215,679, col. 11, Note (B).

The above data demonstrate that polyisoprene prepared according to this invention has a relatively low inherent viscosity and contains as high or higher cis-content than that obtained with the 3-bromophenyllithium initiators.

EXAMPLE VI

Polymerization initiators were prepared according to the recipe and conditions of Example I except that the time allowed for the reaction after the tetravinyltin was added was varied. These initiators were employed for the polymerization of isoprene using 100 parts by weight of isoprene and 1,000 parts by weight of cyclohexane. The initiator level in each run was 1.5 mhm, polymerization temperature was 70°C, polymerization time was 20 hours. The results are presented in Table VI.

TABLE VI

| Run No. | Reaction Time After Tetravinyltin Addn. hours | Conv. % | Miscrostructure[a] cis | 3,4 Addn. | Inherent[a] Viscosity |
|---|---|---|---|---|---|
| 1 | 1 | 94 | 87 | 5.9 | 3.78 |
| 2 | 2 | 86 | 90 | 6.2 | 3.03 |
| 3 | 6 | 92 | 92 | 5.8 | 3.49 |

[a]As in Table V.

The above data demonstrate that the reaction time between tetravinyltin compound and the haloaryllithium compound prior to charging the polymerization system can be varied. All of the polymers had a high ciscontent and a viscosity within processable ranges.

EXAMPLE VII

Polyisoprene was prepared using a 3-bromophenyllithium-tetravinyltin reaction product prepared as in Example I as the polymerization initiator. The polymer that was produced was compounded in a tread stock and gum stock recipe, cured, and the physical properties determined. The data are presented in Table VII.

TABLE VII

| | |
|---|---|
| Polymerization Recipe | |
| Isoprene, parts by weight | 100 |
| Cyclohexane, parts by weight | 1000 |
| Initiator, mhm | 1.2 |
| Temperature, °C | 70 |
| Time, hours | 8 |
| Conversion, % | 82.3 |
| Polymer Properties | |
| Microstructure, %[1] | |
| cis | 87 |
| 3,4-Addition | 5.7 |
| Inherent viscosity[1] | 4.27 |
| Gel, %[1] | 0 |
| Tread Stock Recipe, Parts by Weight | |
| Polymer | 100 |
| High abrasion furnace black | 50 |
| Zinc oxide | 3 |
| Stearic acid | 3 |
| Flexamine[1] | 1 |
| Flexzone 3C[2] | 2 |
| Aromatic Oil (Philrich 5)* | 5 |
| Vultrol[3] | 1 |
| Sulfur | 2.25 |
| NOBS Special[1] | 0.65 |
| Cured 30 Minutes at 293°F | |
| 300% Modulus, psi[1] | 1370 |
| Tensile, psi[1] | 3880 |
| Elongation, %[1] | 620 |
| Maximum tensile at 200°F, psi[6] | 2110 |
| T, °F[1] | 38.0 |
| Resilience, %[1] | 73.9 |
| Shore A hardness[1] | 60 |
| Gum Stock Recipe, Parts by Weight | |
| Polymer | 100 |
| Zinc oxide | 5 |
| Stearic acid | 3 |
| Sulfur | 2.7 |
| Santocure[4] | 0.8 |
| BLE[5] | 1 |
| Cured 30 Minutes at 293°F | |
| 300% Modulus, psi[1] | 270 |
| Tensile, psi[1] | 3770 |
| Elongation, %[1] | 780 |

[1]As in Example III.
[2]N-isopropyl-n'-phenyl-p-phenylenediamine.
[3]N-nitrosodiphenylamine.
[4]N-cyclohexyl-2-benzothiazolesulfenamide.
[5]High-temperature reaction product of diphenylamine and acetone. [6]Determined as in ASTM D 412-62T.
*Trademark The above data demonstrate that the polyisoprene prepared according to this invention has very good properties when evaluated in tread stock and gum stock recipes.

As will be evident to those skilled in the art, various modifications of this invention can be made or followed, in light of the disclosure herein set forth without departing from the scope or the spirit thereof.

We claim:
1. A polymerization process comprising contacting under polymerization conditions at least one polymerizable monomer with a polymerization initiator which forms on admixing components consisting essentially of a vinyltin compound and a haloaryllithium compound, wherein said haloaryllithum compound is 3-halophenyllithium, 1-halo-3-naphthyllithium, 3-halo-1-naphthyllithium, milled 4-halophenyllithium, milled 4-halonaphthyllithium, or mixtures thereof, said admixing is conducted for at least about 30 minutes at a temperature in the range of about 30° to 100° C, and wherein the mole ratio of said haloaryllithium compound to said vinyltin compound is within the range of about 1:1 to 4:1, and said vinyltin compound is represented by the formula:

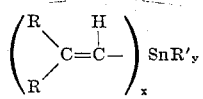

wherein x is an integer from 1 to 4 and y is an integer such that the sum of z and y equals 4, each R is hydrogen or an alkyl or cycloalkyl hydrocarbon radical containing up to six carbon atoms, and each R' is an alkyl, cycloalkyl or aryl radical containing up to 12 carbon atoms, and wherein said polymerizable monomer is a conjugated diene containing up to about 12 carbon atoms per molecule, a vinyl-substituted aromatic compound wherein the total carbon atoms in combined hydrocarbon substituents is not greater than about 12, a polar compound wherein said polymerizable polar compound is a vinylpyridine, vinylquinoline, or vinylisoquinoline, wherein the vinyl groups thereof are positioned on a ring carbon other than a B-carbon with respect to the nitrogen, acrylic or alkacrylic acid ester, nitrile or N,N-di-substituted amide, vinylfuran, or N-vinylcarbazole, or mixtures of any two or more thereof.

2. The process according to claim 1 wherein said polymerization conditions include a temperature in the range of about 0° to 150° C; a pressure sufficient to maintain the reaction mixture substantially in a liquid phase; said polymerization process is conducted in the further presence of an inert hydrocarbon diluent; and said polymerization initiator is employed at an initiator level sufficient to provide about 0.1 to 10 gram millimoles of initiator per 100 grams of monomer.

3. The process according to claim 2 wherein said admixing is conducted for about 30 minutes to 10 hours, at a temperature of about 30° C. to 100° C., and in the presence of an inert hydrocarbon diluent containing four to 10 carbon atoms per molecule.

4. The process according to claim 3 wherein said polymerizable monomer is at least one conjugated diene.

5. The process according to claim 4 wherein said polymerizable monomer is isoprene or 1,3-butadiene.

6. The process according to claim 5 wherein said vinyltin compound is tetravinyltin.

7. The process according to claim 6 wherein said haloaryllithium compound is a 3-halophenyllithium.

8. The process according to claim 7 wherein said 3-halophenyllithium is 3-bromophenyllithium.

9. The process according to claim 1 wherein said polar compound monomer is said vinylpyridine, vinylquinoline, or vinylisoquinoline, further substituted with alkyl, cycloalkyl, aryl, or combination group, alkoxy, aryloxy, or dialkylamino group, such that the total number of carbon atoms in the substituents is not greater than 12.

10. The process according to claim 1 wherein said polar compound monomer is 2-vinylpyridine, 4-vinylpyridine, 5-n-octyl-2-vinylpyridine, 4-phenyl-2-vinylpyridine, 4-phenoxy-2-vinylpyridine, 6-methoxy-2-vinylpyridine, 4-vinylquinoline, 3-methyl-4-vinylquinoline, 3-methyl-4-methoxy-2-vinylquinoline, 3-vinylisoquinoline, 4-tert-dodecyl-1-vinylisoquinoline, 3-dimethylamino-3-vinylisoquinoline, 4-benzyl-3-vinylisoquinoline, methyl acrylate, ethyl acrylate, butyl acrylate, methyl methacrylate, ethyl methacrylate, propyl methacrylate, butyl methacrylate, isopropyl ethacrylate, acrylonitrile, methacrylonitrile, N,N-dimethylacrylamide, N,N-diethylmethacrylamide, vinylfuran, or N-vinylcarbazole.

* * * * *

UNITED STATES PATENT OFFICE
CERTIFICATE OF CORRECTION

Patent No. 3,725,376                                                               Dated: April 3, 1973

It is certified that error appears in the above-identified patent and that said Letters Patent are hereby corrected as shown below:

Claim 1, Column 11, line 6 change "z" to --- x ---.

Signed and sealed this 16th day of April 1974.

(SEAL)
Attest:

EDWARD M. FLETCHER, JR.                               C. MARSHALL DANN
Attesting Officer                                                  Commissioner of Patents